(12) United States Patent
Mac.Smith et al.

(10) Patent No.: US 6,449,684 B1
(45) Date of Patent: Sep. 10, 2002

(54) DATA CARRYING DEVICE AND SYSTEMS FOR USE THEREWITH

(75) Inventors: David L. Mac.Smith; Ben Garton, both of East Sydney (AU)

(73) Assignee: Catuity, Inc., Detroit, MI (US)

( * ) Notice: Subject to any disclaimer, the term of this patent is extended or adjusted under 35 U.S.C. 154(b) by 0 days.

(21) Appl. No.: 09/462,026

(22) PCT Filed: Dec. 4, 1998

(86) PCT No.: PCT/AU98/01009

§ 371 (c)(1),
(2), (4) Date: Dec. 30, 1999

(87) PCT Pub. No.: WO99/52065

PCT Pub. Date: Oct. 14, 1999

(30) Foreign Application Priority Data

Apr. 1, 1998 (AU) .............................................. PP 2740

(51) Int. Cl.[7] .............................................. G06F 12/02
(52) U.S. Cl. ........................ 711/103; 711/170; 711/163; 713/200; 705/26; 705/41; 705/45; 705/56; 705/57
(58) Field of Search ........................ 711/4, 5, 101–105, 711/111–115, 170, 202–206, 103; 707/200–206; 705/26, 41–45, 57, 56; 713/200

(56) References Cited

U.S. PATENT DOCUMENTS

| | | | |
|---|---|---|---|
| 4,068,213 A | 1/1978 | Nakamura et al. | 235/381 |
| 4,529,870 A | 7/1985 | Chaum | 235/381 |
| 4,554,446 A | 11/1985 | Murphy et al. | 235/487 |
| 4,709,137 A | 11/1987 | Yoshida | 705/41 |
| 4,736,094 A | 4/1988 | Yoshida | 705/41 |
| 4,739,295 A | 4/1988 | Hayashi et al. | 235/379 |
| 4,747,049 A | 5/1988 | Richardson et al. | 705/17 |
| 4,749,982 A | 6/1988 | Rikuna et al. | 340/146.2 |
| 4,752,677 A | 6/1988 | Nakano et al. | 235/380 |
| 4,798,322 A | 1/1989 | Bernstein et al. | 235/487 |
| 4,877,947 A | 10/1989 | Mori | D18/4 |
| 4,882,675 A | 11/1989 | Nichtberger et al. | 705/14 |
| 4,949,256 A | 8/1990 | Humble | 705/14 |
| 4,959,788 A | 9/1990 | Nagata et al. | 705/41 |
| 5,008,519 A | 4/1991 | Cunningham et al. | 235/383 |
| 5,013,896 A | 5/1991 | Ono et al. | 235/381 |
| 5,047,614 A | 9/1991 | Bianco | 235/385 |
| 5,126,935 A | 6/1992 | Saitou et al. | 705/22 |
| 5,140,517 A | 8/1992 | Nagata et al. | 705/41 |
| 5,192,854 A | 3/1993 | Counts | 235/375 |
| 5,256,863 A | 10/1993 | Ferguson et al. | 380/24 |
| 5,380,991 A | 1/1995 | Valencia et al. | |
| RE35,117 E | 12/1995 | Rando et al. | 235/380 |
| 5,521,363 A | 5/1996 | Tannenbaum | 235/379 |
| 5,559,313 A | 9/1996 | Claus et al. | 705/30 |
| 5,603,001 A | * 2/1997 | Sukegawa et al. | 711/103 |
| 5,608,902 A | * 3/1997 | Iijima | 707/200 |
| 5,659,166 A | 8/1997 | Mori et al. | 235/380 |
| 5,699,549 A | * 12/1997 | Cho | 711/115 |

FOREIGN PATENT DOCUMENTS

| | | |
|---|---|---|
| AU | A-52881/98 | 8/1998 |
| DE | 3620755 A1 | 12/1987 |
| DE | 3911667 A1 | 10/1990 |
| EP | 0116939 A2 | 8/1984 |

(List continued on next page.)

*Primary Examiner*—Than Nguyen
(74) *Attorney, Agent, or Firm*—Harness, Dickey & Pierce, P.L.C.

(57) ABSTRACT

A data carrying device having a memory space (1) for storing data at a plurality of locations. The memory space includes a static area (2) residing at a fixed location; an index area residing at a first dynamically allocatable location; and an application area (4) residing at a second dynamically allocatable location. The static area (2) is configured to hold data pointing to the location of the index area (3) and the index area (3) is configured to hold data indicative of applications or programs residing within the application area (4).

1 Claim, 4 Drawing Sheets

FOREIGN PATENT DOCUMENTS

| | | |
|---|---|---|
| EP | 0189691 A1 | 8/1986 |
| EP | 0253240 A1 | 1/1988 |
| EP | 0 657 851 A2 | 12/1994 |
| EP | 0660962 B1 | 7/1995 |
| EP | 0668581 A1 | 8/1995 |
| GB | 2094532 A | 9/1982 |
| GB | 2130412 A | 5/1984 |
| GB | 2 294 562 A | 5/1996 |
| JP | 52016941 A | 2/1977 |
| JP | 55047560 A | 4/1980 |
| JP | 63316196 A | 12/1988 |
| JP | 2087294 A | 3/1990 |
| JP | 2113396 A | 4/1990 |
| JP | 2249099 A | 10/1990 |
| JP | 3002996 A | 1/1991 |
| JP | 30271995 A | 12/1991 |
| JP | 4070992 A | 3/1992 |
| JP | 4070993 A | 3/1992 |
| JP | 4086990 A | 3/1992 |
| JP | 40205596 A | 7/1992 |
| JP | 40242890 A | 8/1992 |
| JP | 5174249 A | 7/1993 |
| JP | 5225221 A | 9/1993 |
| JP | 6096293 A | 4/1994 |
| JP | 6103422 A | 4/1994 |
| WO | WO 91/18373 | 11/1991 |
| WO | WO 94/09454 | 4/1994 |
| WO | WO 95/02871 | 1/1995 |
| WO | WO 95/14287 | 5/1995 |
| WO | WO 97/06516 | 2/1997 |

* cited by examiner

DATA CARRYING DEVICE AND SYSTEMS FOR USE THEREWITH

FIELD OF THE INVENTION

The present invention relates to a data carrying device and systems for use therewith.

The invention has been developed primarily for use as a smart-card system and will be described hereinafter with reference to this application. However, it will be appreciated that the invention is not limited to this particular field of use.

BACKGROUND

Known smart-cards are generally configured differently depending upon the particular functions they are to perform. Typically, the memory space of prior art smart-cards contain various segments of fixed size, each of which are dedicated to the storage of a particular kind of data relating to a specific application/programme. Such utilisation of the limited resources generally available in a smart-card results in limited overall functionality. For example, in the prior art, a 1K card typically supports 1, 2 or 3 predetermined and fixed applications/programmes.

It is known to format data on smart-cards such that each application resides in a separate directory, for example in accordance with International standard ISO 7816.

In practice however, it has been appreciated by the applicant that these formats are not suited for devices such as smart-cards if they are configured to support large numbers of applications and programmes because the amount of resources required to support the resulting elaborate application and directory structure is excessive.

Additionally, the differing formats adopted by different card providers for different applications or programmes seriously limits the inter-operability of present day smart-card systems. In other words, a smart-card supplied by a given card provider or card issuer for a particular programme and configured to fulfil a particular function, will general not be compatible with the hardware and operating systems of different card providers, or hardware and operating systems designed to fulfil a different function, or the potential limitless number of different programmes or functions required by the many different card providers, card issuers or users of the different functions and programmes.

Known smart-card systems are typically custom made to support a small number of specific applications running under fixed constraints. Changes to the system usually require revision of the software and possibly the associated hardware, involving long lead times and substantial expense. The low number of applications/programmes supported by each card and the lack of flexibility inherent in the current approach has seriously limited the functionality and interoperability of present day smart-card technology.

SUMMARY OF THE INVENTION

It is an object of the present invention to overcome or ameliorate one or more of the disadvantages of the prior art, or at least to provide a useful alternative.

According to one aspect of the invention, there is provided a data carrying device having a memory space for storing data at a plurality of locations, said memory space including:

a static area residing at a fixed location;
an index area residing at a first dynamically allocatable location; and
an application area residing at a second dynamically allocatable location, said static area being configured to hold data pointing to the location of said index area and said index area being configured to hold data indicative of applications or programmes residing within said application area.

Preferably the index area is configured to hold data indicative of programmes residing within the application area.

According to a second aspect of the invention, there is provided a data carrying device having a memory space for storing data at a plurality of locations, said memory space including an application area divided into a plurality of units, each being configurable to store data associated with part or all of a programme, the location of any unit, or units corresponding to any programme being dynamically allocatable.

Preferably the size of said unit is small compared to the size of the segments utilised in the prior art.

As used in this document, the term "data carrying device" includes, for example, contact or contactless smart-cards, magnetic striped cards, chip bearing devices such as watches, key rings, keys, phones, small pocket devices, electronic wallets and the like.

According to another aspect of the invention there is provided a system for manipulating data on a plurality of data carrying devices, said system including at least one host and one or a plurality of terminals, each terminal being adapted to interact with said data carrying devices, the terminals and the host being adapted to communicate parameter files therebetween, each of said terminals further including software being activatable and configurable in response to said parameter files so as to initiate and/or update data on said data carrying devices. Preferably, the software in each terminal is substantially functionally identical.

Alternatively the software may reside in the host rather than the terminals. In this embodiment, the software is separate from the host software.

Preferably the data carrying devices referred to in the system of the invention are in accordance with that of the first and/or second aspect of the invention.

As used in this document, the term "software" includes functional equivalents such as hardware configured to give the same, or a similar, result, for example EPROM, firmware, etc.

The system of the present invention allows each of the applications to be implemented many times over. For example, any one data carrying device may, at any time, hold numerous different tickets for various unrelated services. Each implementation of an application, for example each individual ticket, requires data to be stored in at least one unit of the application area. Each implementation of an application is referred to in this document as a "programme". The ability of the present invention to support numerous programmes relating to numerous different applications compares favourably to prior art smart-card systems which typically offer only a small fraction of such functionality for cards having identical resources.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
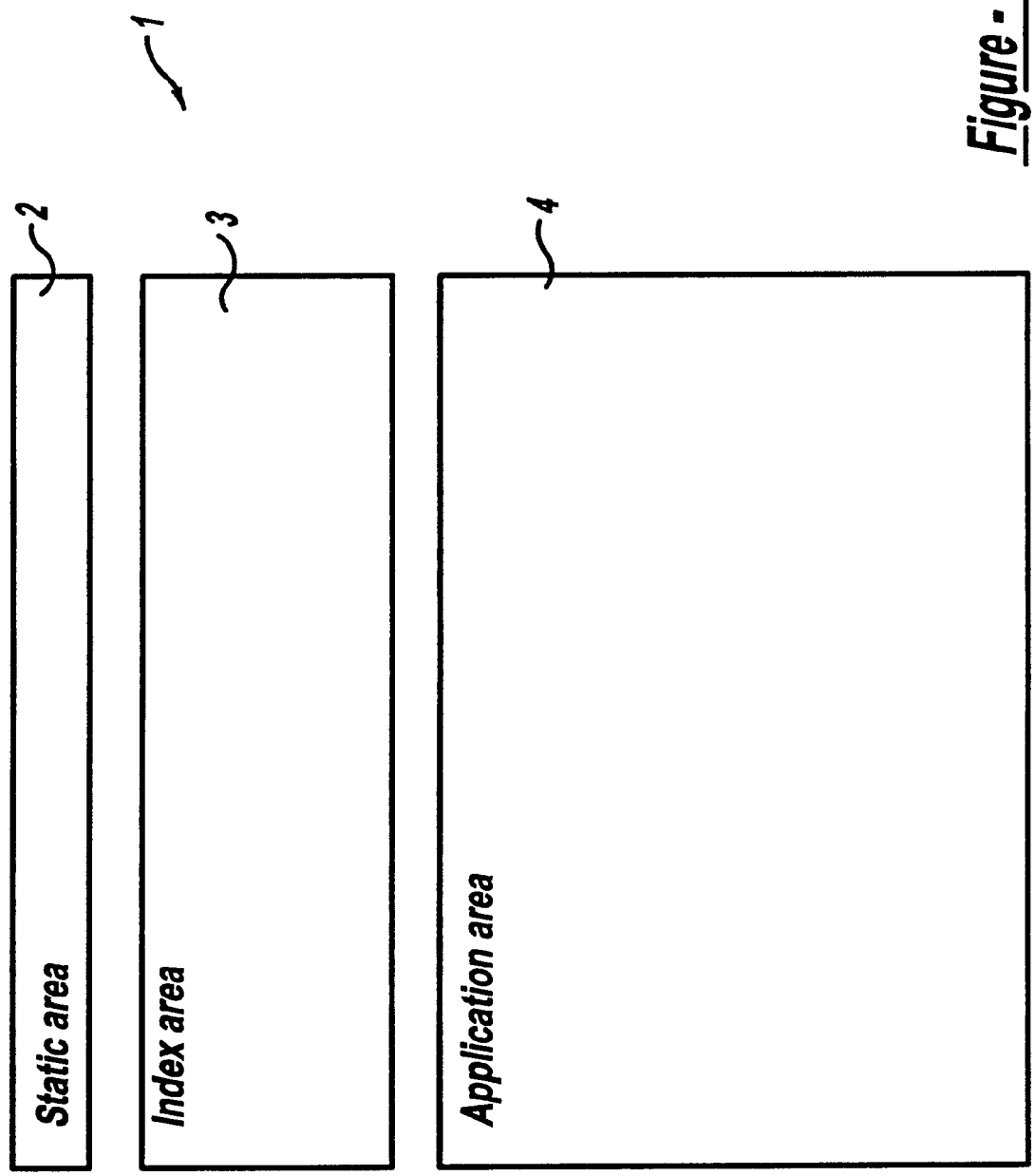
FIG. 1 is a schematic view of a memory space according to the invention.

Referring to the drawings, the data carrying device (not shown) has a memory space 1 for storing data at a plurality of locations, said memory space including:

a static area 2 residing at a fixed location;

an index area 3 residing at a first dynamically allocatable location; and an application area 4 residing at a second dynamically allocatable location.

The first and second dynamically allocatable locations allow the index area and application area to be defined within any portion of the memory space. Advantageously, this provides a security safeguard because memory spaces on different devices can be formatted differently such that a location corresponding to a given type of information on a first memory space will not necessarily correspond to a location of similar data in a second memory space. Additionally, the flexibility inherent in providing dynamically allocatable locations enables different data carrying devices, having different amounts, configurations and available regions of memory space, to operate efficiently within the one system. For example, the present invention allows for memory space to be reserved in a standard format on the majority of the popular, presently available smart-cards, despite differing memory capacities and memory location formats. In particular, the present invention can co-exist on and with numerous pre-existing third-party smart-card systems and pre-existing payment systems, such as Visa Cash, Mondex, Chipper, debit, credit and cash, provided sufficient spare memory space is available on a smart-card. In other words, any device formatted in the above described manner can be used in any of the terminals of the present invention (unless such use is specifically prohibited by a rule defined by a parameter file).

Figure 2:
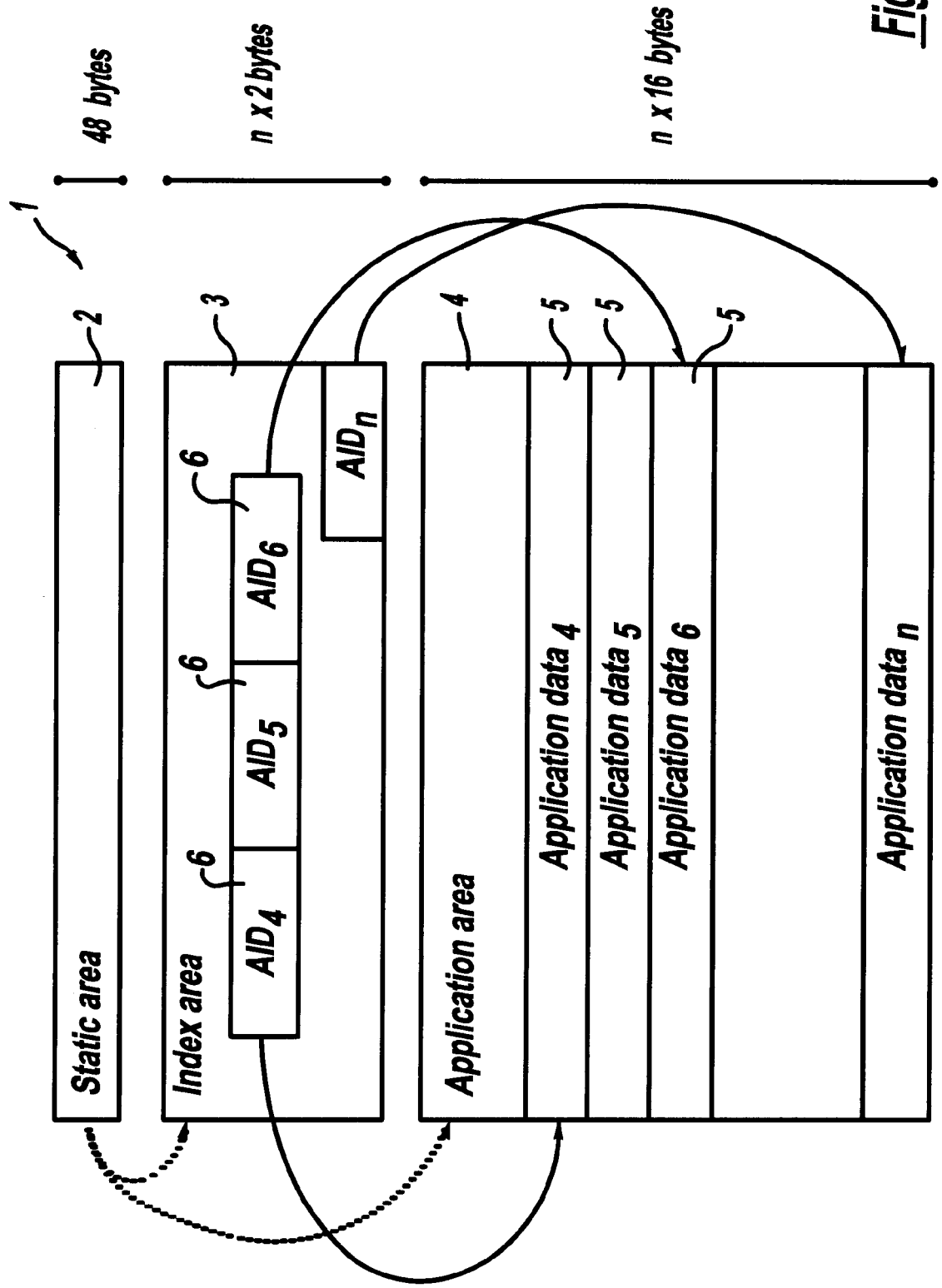
FIG. 2 is another schematic representation of a memory space according to the invention showing a preferred relationship between the index area and the application area.

As shown in FIG. 2, the application area 4 is divided into a plurality of units 5, each being configurable to store data associated with part, or all of, a programme. The location of any unit, or units corresponding to any programme is dynamically allocatable. The size of a unit 5 is small compared to the size of the segments utilised in the prior art. For example, a prior art segment (which holds data corresponding to one application/programme only) may have a pre-defined size of, say, 500 bytes. However, if the actual memory space used by the application/programme is less than this fixed amount, say, 100 bytes, this arrangement results in significant wasted resources, in this example 400 bytes.

In contrast, the size of the units used in the preferred embodiment of the present invention is 16 bytes. Once a programme (ie the data relating to an application) has been written to the minimum number of units required, the next blank unit is then available for the writing of another programme because the location of any unit corresponding to any programme is dynamically allocatable. Hence, the amount of wasted resources lying between consecutive programme data can be arranged to never exceed 15 bytes. Therefore the present invention allows multiple programmes to be written to the application area in a far more memory space efficient manner by minimising wasted resources between programmes.

Additionally, because the programmes all reside within the application area of the present invention, the wasted resources associated with creating a separate directory for each application/programme are avoided.

The present invention advantageously allows the application area 4 to be utilised by the system of the present invention on an "as required" basis. For example, if only one application is being run on a particular data carrying device, for example ticketing, then substantially the whole of the application area is available for storage of data relating to ticketing programmes. This compares favourably to the prior art where predefined segments of memory space, having a fixed size, are provided for each application supported by the prior art system. Hence, memory space is allocated regardless of whether it is required by a particular data carrying device.

The static area 2 is configured to include data indicative of any of the following:

an entity responsible for issuing the data carrying device;

an issuing country;

a card group;

a unique device identification number;

whether the device is personalised;

a date and time at which the device was initialised;

the location of said application area;

a size of said application area;

a device model; and/or an entity responsible for initialising the data carrying device.

The data indicative of whether the-device is personalised may be used, for example, in smart-cards to indicate whether the name of the card holder is embossed thereon.

The static area 2 is configurable as either random access memory, or read only memory, by means of setting an access control block (not shown). In the preferred embodiment, the static area 2 is configured as random access memory prior to an initialisation process whereby the above data is written to the static area. After the initialisation process, the static area is configured as read only memory so as to prevent inadvertent or unauthorised changes to the data.

The provision of the data in the static area 2 enables the allocation of memory space 1 on a data carrying device to be individually tailored for each device at the time of initialisation. This enables far greater flexibility than the prior art systems which require allocation of space to be fixed for the effective lifetime of the system. Hence, the present invention allows the values in the static area 2 to be changed for each newly initialised device so as to readily allow for the development of new products having different space requirements and yet still operating within the same system.

The location of the static area 2 is fixed as it effectively controls access to all other areas on the data carrying device. In the preferred embodiment, the static area is placed in the first available memory location of the device.

The index area 3 is configured to hold a plurality of index entries 6 representing numbers, each of which uniquely correlate with applications residing within the application area 4 according to a predetermined correlation scheme. In the scheme of the preferred embodiment, the number may range between 0 and 65535. For example, 00100 corresponds to an application holding device variables. Numbers in the range of 10,000 to 19,999 are reserved for loyalty program applications. The range 20,000 to 29,999 is reserved for pass applications such as membership, access control and tickets. 30,000 to 39,999 is reserved for electronic purse applications and 40,000 to 49,999 for account applications.

As will be appreciated by those skilled in the art, the correlation scheme can be tailored so as to uniquely match any number with a specific application. In some embodiments, an order of location of the index entry numbers 6 corresponds respectively with an order of location of the applications.

In the preferred embodiment, the application area is segmented into units 5 and the index area 3 is configured to hold a plurality of index entries 6 representing numbers, each of which uniquely correlate with the programmes written onto the units according to the predetermined correlation scheme. In this embodiment, an order of location of said numbers corresponds respectively with an order of location of said units 5. This relationship is shown in FIG. 2 whereby index area entry n defines the contents of the application and programme in the corresponding application unit n.

Each index entry is initially set to zero during the initialisation process so as to indicate that no programmes have yet been stored in the application area. As programmes are subsequently written to the application area, the index entries are correspondingly updated.

If necessary, some of the programmes may expire once predetermined expiry criteria are fulfilled. For example, an programme may expire once a certain date is reached or once a certain number of transactions have been completed. The units 5 occupied by an expired programme are available for the writing of a replacement programme. Similarly, the index entries 6 corresponding to said expired units 5 are available for the writing of replacement index entries 6 corresponding to said replacement programme. In a preferred embodiment, the units 5 occupied by an expired programme are only available for the writing of the replacement programme if all index entries 6 indicative of the programmes in the units 5 are non-zero. This ensures that all free units 5 are utilised before data in an expired unit is over-written.

An application specifically tailored to store device variables useful for the efficient running of a smart-card system may include data indicative of any one of the following:

a data carrying device status;

counters;

various dates and times;

security data records and other operating variables.

Figure 3:
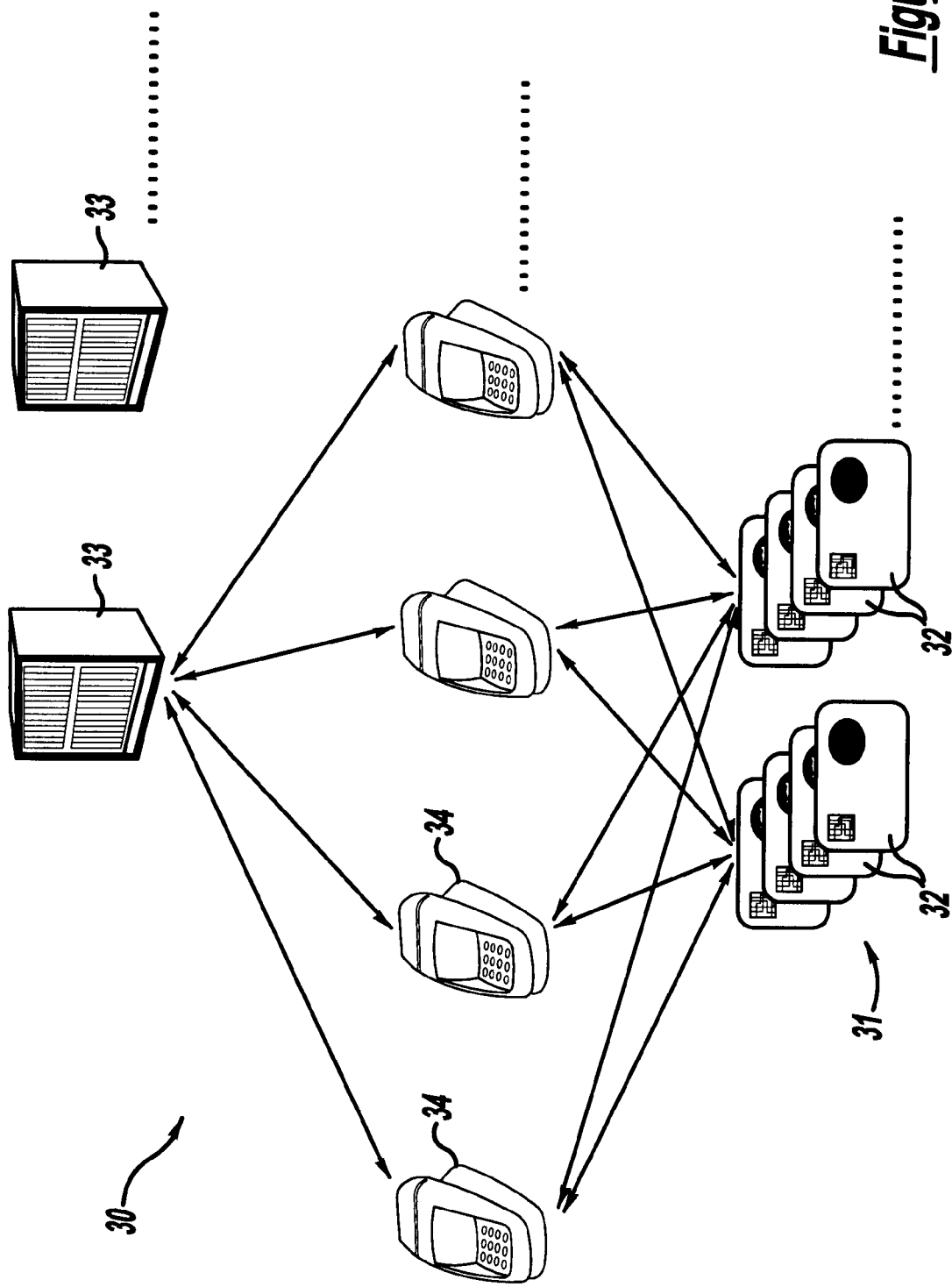
FIG. 3 is a schematic diagram of a system according to the present invention.

As shown in FIG. 3, the preferred embodiment of the system 30 for manipulating data on a plurality of data carrying devices 31, preferably smart-cards 32, includes at least one host 33 and one or a plurality of terminals 34, each being adapted to interact with said data carrying devices 31. In particular, the terminals 34 are adapted to read from the static area 2, index area 3 and application area 4 of each data carrying device 31 and to write to the index areas 3 and the application areas 4.

The terminals 34 and the host 33 are adapted to communicate parameter (not shown) files therebetween. Such communication may be by means of an on-line connection between the host 33 and each of the terminals 34. Some alternative embodiments of the invention accomplish communication between the host 33 and the terminals 34 by means of a portable data carrying device (not shown). The latter form of communication is especially suited for terminals 34 located in remote areas where on-line connection may not be feasible, or for example, in an automated vending machine for which the establishment of an on-line connection would not be financially viable. In another preferred embodiment (not illustrated) the terminal is, in effect, the same computer as the host and the communication occurs between the different software in the same computer. In this preferred embodiment, the host has "terminal software" which is separate from the "host software".

Figure 4:
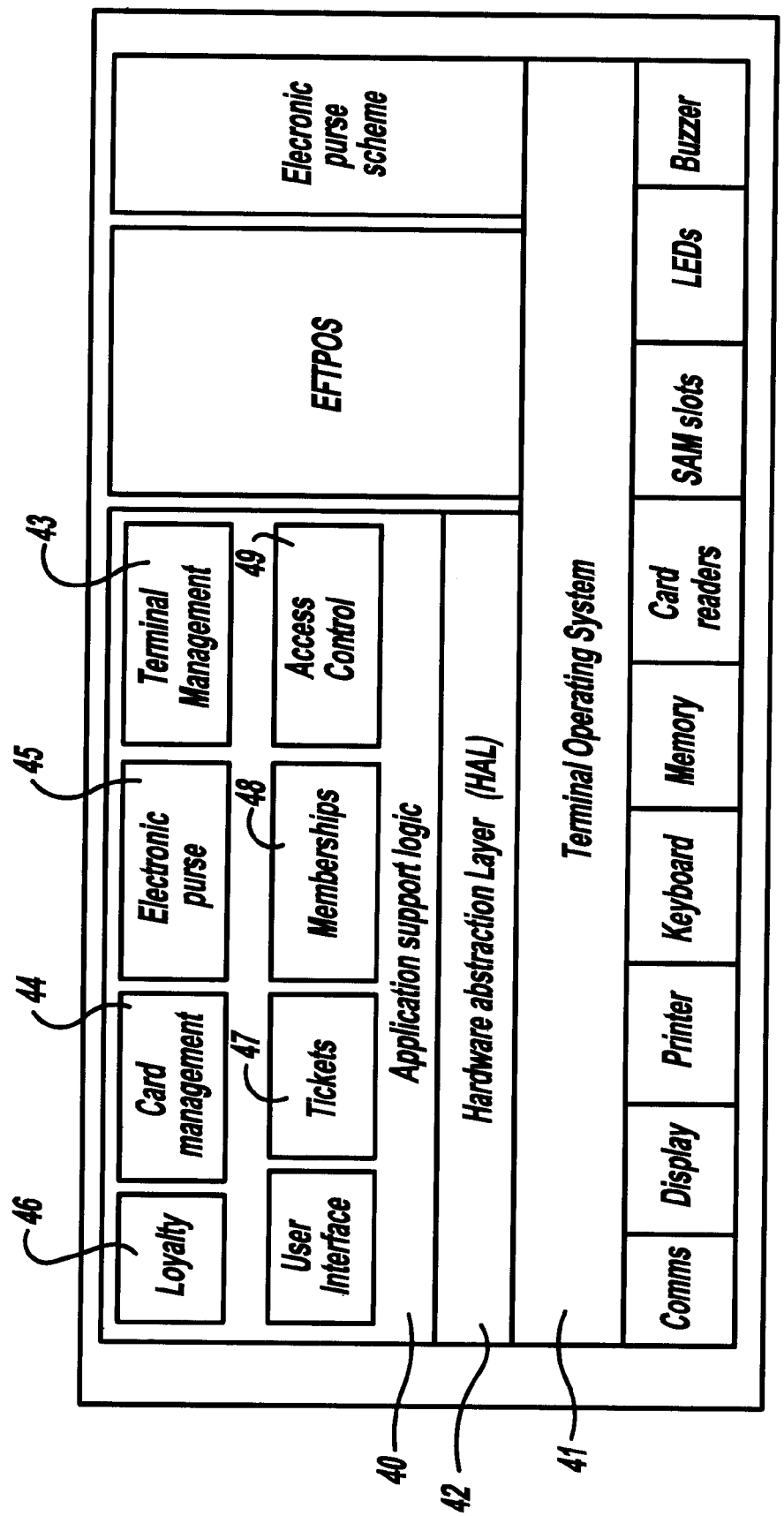
FIG. 4 is a schematic diagram of software included in each of the terminals.

Each of the terminals 34 further includes functionally identical software 40 (labelled "Application Support Logic" in FIG. 4) being activatable and configurable in response to said parameter files so as to initiate and/or update data on said data carrying devices 31. In this document, the scope of the term "functionally identical" includes software comprising or formed from differing source codes but achieving similar or preferably identical overall functionality.

The use in terminals 34 of software being activatable and configurable in response to parameter files sent from a host 33 enables the system 30 of the present invention to offer a far greater range of functions than has hitherto been available in smart-card systems. Depending upon the number of applications and programmes supported by the system, and the number of ways in which each application can be implemented to form a programme, the system can be configured to run thousands of programmes relating to large numbers of applications. For example, the preferred embodiment can be configured to support from less than 5 to 50 or more different applications, each of which can result in a large number of different programmes, the exact details of which will vary depending upon the contents of the parameter files communicated between the terminals and the host. Hence the system of the present invention provides for a huge range of options. For example the preferred embodiment provides capability for over 36 different concurrent programmes running on one data carrying device having a memory storage capacity of 1K. Additionally, over 65,000 different concurrent programmes can be supported by one host.

The amount of data communicated in the parameter files is comparatively small in relation to the size of the software 40 required to provide the various applications and programmes implemented by smart-cards. Hence, limiting communication predominantly to parameter files helps to minimise the time, resources and expense associated with communications between the terminals 34 and the host 33.

The host 33 is configured to receive and store the data sent from all terminals 34 so that a central record of all interactions between all terminals 34 and data carrying devices 31 may be maintained. If terminals 34 send batch data to the host 33 on a daily basis, then the records kept on the host should be current for all transactions carried out up to, and including, the preceding day.

The system 30 of the present invention is designed to work in conjunction with many of the pre-existing-card and terminal systems. Hence, the system 30 must run on many different terminals 34, often having different operating systems 41. For this reason, the software 40 in each of the terminals 34 includes at least one of the aforesaid many possible operating systems 41, an application module 40 common to all terminals 34 in the system 30 and a hardware abstraction layer 42 being adapted to integrate said operating system 41 and said application module 40. This structure is shown schematically in FIG. 4. In this manner, the core application module 40 can be copied in a substantially identical form to all terminals 34, each of which also include a hardware abstraction layer 42 specifically tailored to integrate the application module 40 with the particular operating system 41 of the terminal 34. This arrangement advantageously allows the software 40 to be readily implemented upon many differing types of pre-existing terminal 34 in an efficient manner.

The application module 40 common to all terminals 34 includes the full variety of applications supported by the system. Some or all of the applications are dormant until such time as a parameter file is received by the terminal 34 from the host 33 so as to initiate and subsequently modify applications and/or programmes as desired. As presently contemplated, the preferred embodiment includes the following applications:

Terminal Management 43;
Device Management44;
Electronic Purse and other payment systems 45;
Loyalty and Incentive Programs46;
Electronic Tickets 47;
Memberships and 48;
Access Control and Authentication 49.

The terminal management application 43 provides a means whereby field service technicians can manipulate various operating parameters, for example:

a merchant identification number;
a terminal identification number;
a host phone number and associated parameters.

The terminal management application 43 also provides for data storage means adapted to record details of all interactions between the terminal 34 and the data carrying devices 31, said details being stored in a current transaction log file. The terminals 34 further include means for batch communication of data stored in the data storage means to said host 33. The use of batch communication is preferable to communicating with the host 33 during every interaction between a terminal 34 and a data carrying device 31 because the interactions can thereby proceed far more swiftly. Additionally, the use of batch processing reduces the overall communication costs. In the preferred embodiment, the terminals 34 communicate with the host 33 on a daily basis in a process referred to as "settlement". The settling process involves the terminal dialling a preset phone number and entering into a communications dialogue with the host. Once authenticated, the terminal uploads its current transaction log file and downloads a new parameter file, if necessary. The terminal management application 43 will preferably provide means whereby the settlement process is automatically initiated by the terminal 34 at a predetermined time each day.

The card management application 44 checks every card that is presented to a terminal and will activate other applications or programmes only when the card management application 44 determines that the data carrying device 31 presented to the terminal 34 contains a legitimate file structure, that is, a file structure having a static area 2, index area 3 and application area 4 as described above. The card management application 44 will determine a card group into which the data carrying device 31 falls. The card groups may be differentiated based upon criteria such as: country code; issuer ID; physical appearance, target market for the device and device group. The card group can be used to determine the rules of transaction between the terminal 34 and the device 31. The preferred embodiment of the present invention can advantageously interact with devices 31 falling within different card groups and terminal groups. Additionally, the rules which define the transactions between the terminal 34 and a given card group can be readily altered by exchanging parameter files between the host 33 and the terminal 34. In some embodiments, the rules of transaction relating to a given card group or a given programme are written within programmes stored on the data carrying device 31.

The card management application 44 also controls the expiry and renewal of the data carrying device 31 based upon parameters received from the host 33 on a card group basis. Another parameter received from the host 33 defines a reminder period for renewals, for example one month. In this case, device renewal may occur only during the reminder period, being the calendar month leading up to the expiry date. During the reminder period the device holder is notified of impending device expiry by messages that are included at the bottom of transaction receipts. The card management application 44 keeps track of a status of the device 31, for example either "initialised", "issued" or "blocked". The host 33 maintains a list of blocked devices 31 that it sends to terminals 34, by means of parameter files, on a regular basis. When a terminal 34 encounters a device 31 that is included on the blocked list, the terminal 34 changes the status of the device 31 to "blocked".

The electronic purse application 45 is responsible for reading and writing electronic representations of money to and from the data carrying devices 31 during transactions.

The loyalty programme application 46 is responsible for reading and writing loyalty points to and from the data carrying device 31. This application implements rules whereby loyalty points accumulate on the basis of predefined activities, such as purchase amounts, purchase frequencies, data carrying device renewal etc. Such points can be implemented in schemes by merchants whereby accumulation of points beyond a predetermined threshold results in some reward for the device holder.

The electronic ticket application 47 allows the data carrying devices 31 to support ticket functionality. For example, tickets to use a bus service could be purchased from a terminal owned by a retail merchant, with the necessary ticket data being written to the data carrying device 31. Terminals 34 are provided at entry or exit points to the bus service and the ticket data on the device 31 is updated as necessary as the device 31 passes through the terminals 34.

The membership application 48 and access control application 49 are functionally similar to the electronic ticket application 47.

Although the invention has been described with reference to specific examples, it will be appreciated by those skilled in the art that the invention may be embodied in many other forms.

What is claimed is:

1. A system for manipulating data on a plurality of data carrying devices, said system including a host and a plurality of terminals, each terminal being adapted to interact with said data carrying devices, the terminals and the host being adapted to communicate parameter files therebetween, each of said terminals further including functionally identical software being activatable and configurable in response to said parameter files so as to initiate and/or update data on said data carrying devices;

said software in each of said terminals including at least one of a plurality of possible operating systems, an application module including a plurality of applications common to all terminals in the system and a hardware abstraction layer being adapted to integrate said operating system and said application module; and wherein said plurality of applications includes the following:

terminal management;
card management;
electronic payment;
loyalty programs;
electronic tickets;
memberships;
access control and authentication.

* * * * *